J. C. MORTON.
BUGGY TOP SUPPORT.
APPLICATION FILED MAY 20, 1907.
929,155.  Patented July 27, 1909.
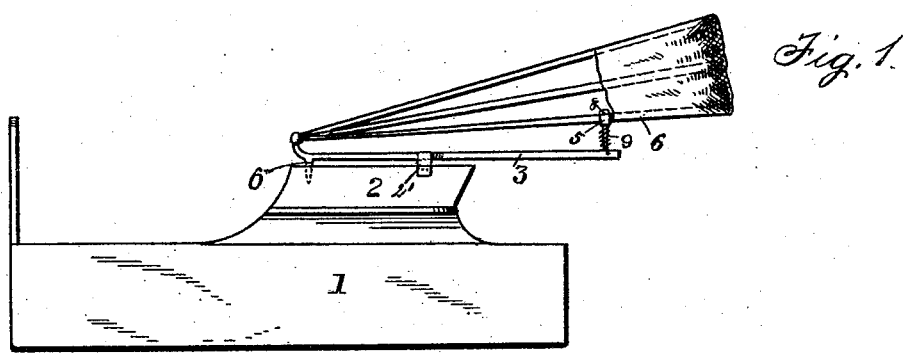
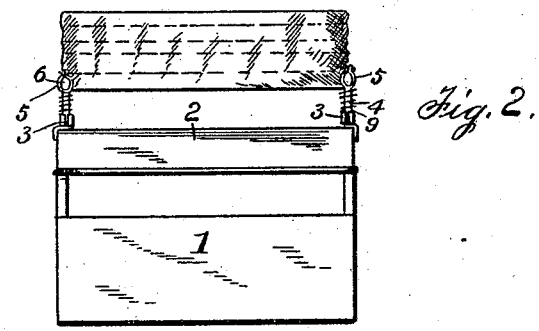
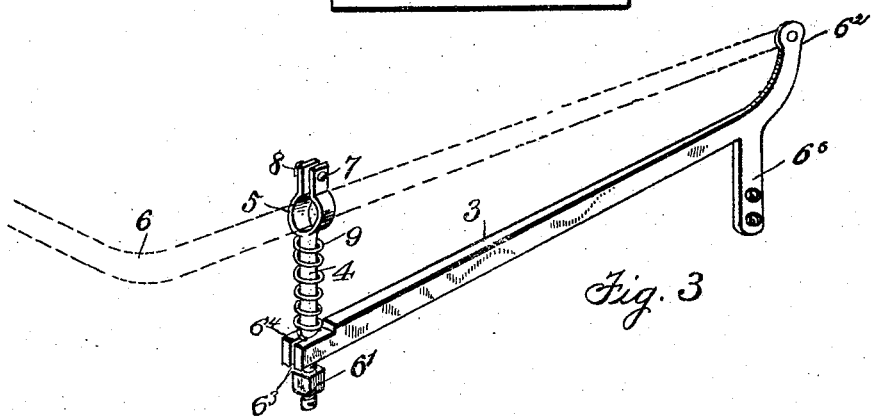
Witnesses
F. L. Ourand
C. H. Griesbauer
Inventor
J. C. MORTON
by H. B. Willson & Co
Attorneys

UNITED STATES PATENT OFFICE.

JOSEPH C. MORTON, OF ELDORADO SPRINGS, MISSOURI, ASSIGNOR OF ONE-HALF TO O. P. CASSITY, OF ELDORADO SPRINGS, MISSOURI.

BUGGY-TOP SUPPORT.

No. 929,155.  Specification of Letters Patent.  Patented July 27, 1909.

Application filed May 20, 1907. Serial No. 374,640.

*To all whom it may concern:*

Be it known that I, JOSEPH C. MORTON, a citizen of the United States, residing at Eldorado Springs, in the county of Cedar and State of Missouri, have invented certain new and useful Improvements in Buggy-Top Supports; and I do declare the following to be a full, clear, and exact description of the invention, such as will enable others skilled in the art to which it appertains to make and use the same.

My invention has relation to new and useful improvements in buggy top supports and has for its object the production of a simple and economical device of this character adapted to be readily attached to a carriage or other vehicle and serve as a cushion support for the back bows of the top to prevent said bows from becoming bent or otherwise damaged.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a side elevation of a vehicle body and top with my invention applied thereto; Fig. 2 is a rear end view of Fig. 1; and Fig 3 is a detail perspective view of one of my improved buggy top supports.

Referring to the drawings, the numeral 1 designates the body of a vehicle having thereon a seat 2, to which is rigidly secured by means of clips 2', suitable supports 3, having at their inner ends upwardly curved portions 6², to which the inner ends of the bows of the top are adapted to be pivoted for the purpose of raising or lowering of the top 6. Adjacent the inner ends of the upwardly curved portion 6², and integral with the forward ends of the supports are brackets 6⁵ which are likewise secured to the seat of the vehicle. The outer ends of the supports 3 are provided with bifurcations 6³, in which is slidably mounted the lower ends of bolts 4, the upper ends of which are provided with spring clips 5 in which is detachably connected the back bows 6 of said top and bolts and nuts 7 and 8 are applied to said clips to prevent displacement of the said back bows. The bifurcated ends of the supports 3 are provided with cut-away portions 6⁴ and coiled springs 9 are provided on said bolts 4 having their upper ends contacting with the clips while their lower ends contact with said cut-away portions of the support. These springs permit of the bows having a yielding motion during travel over the road to prevent damaging of the same. The lower ends of the bolts 4 are screw threaded and project below the bifurcated portions of the supports and on the ends of these screw threaded projections are applied, nuts 6' whereby to hold the bolts in proper positions.

Having thus described my invention, what I claim as new is:—

A structure of the character described, comprising supports rigidly secured to the seat of the vehicle and provided with curved inner ends and having bifurcated outer ends provided with cut-away portions, bolts provided on their upper ends with spring clips which are adapted to detachably connect the back bows of the buggy top with the supports, means for securing the free ends of the clips to prevent displacement of the bows therein, the lower ends of the bolts being slidably mounted within the bifurcated ends of the supports, means for holding said ends of the bolts within the bifurcations, coiled springs on said bolts having their upper ends contacting with said clips and their lower ends contacting with said cut-away portions of said supports, substantially as specified.

In testimony whereof I have hereunto set my hand in presence of two subscribing witnesses.

JOSEPH C. MORTON.

Witnesses:
G. W. HAMLINE,
O. P. CASSITY.